May 30, 1961

D. C. McDONALD 2,986,223

FOLLOW-UP SYSTEM

Filed May 10, 1956

INVENTOR.
Donald C. McDonald.
BY
Thiess, Olson, Mecklenburgh,
von Holst, & Coltman
Attys.

United States Patent Office 2,986,223
Patented May 30, 1961

2,986,223

FOLLOW-UP SYSTEM

Donald C. McDonald, Evanston, Ill., assignor, by mesne assignments, to Cook Electric Company, Chicago, Ill., a corporation of Delaware Filed May 10, 1956, Ser. No. 584,071

1 Claim. (Cl. 170—160.17)

This invention relates to an improved follow-up system and more particularly to a follow-up system for continuously controlling the instantaneous position of a rotating member by comparing the position of the rotating member with a standard.

The particular circumstance which led to the concept herein disclosed was the desirability of synchronizing aircraft propellers to maintain not only velocity agreement therebetween but also positional or phasic agreement. It is believed that one source of irritating vibration in propeller driven aircraft has been the action of the various propellers in multi-engine aircraft generating irregular vibration and air motion as a result of random positional operation.

All modern propeller driven multi-engine aircraft utilize systems for maintaining the engines at a constant speed while producing changes in torque and consequently acceleration and deceleration through variations in the pitch angle of the propellers. Thereby the engine may always be operated at optimum speeds for maximum horsepower and efficiency and minimum wear and deterioration. Various systems are now in use for maintaining the speeds of the engines in multi-engine aircraft in substantial agreement, generally by comparing the speeds of the various engines with a rotating standard in the aircraft fuselage. A servomechanism is generally employed to control the pitch of a given propeller in accordance with the differences between the engine speed and the speed of the standard, increasing the pitch angle of the propeller when the engine is running at a higher speed than the standard, and decreasing the pitch angle when it is desired to increase the engine speed. The same speed agreement may be maintained by using a servomechanism for comparing the speed of all of the engines with any one of the engines, and the instant invention is equally applicable to this type of system. The instant invention is an improvement and modification of the described system in that it not only maintains velocity agreement between various engines of a multi-engine aircraft, but also maintains said engines in phasic agreement.

It is therefore one important object of this invention to provide an improved system for maintaining positional synchronism between a plurality of rotating elements.

It is still a further object of this invention to provide a system for maintaining a multiplicity of rotatable elements driven by a plurality of engines in positional agreement, said system having optimum speed of response and dynamic and static stability.

It is a further object of this invention to provide an improved system for synchronizing engines both in speed and in the respective angular positions of drive shafts or rotatable driven elements, and wherein servomechanisms are applied to sense discrepancies in velocity and angular position from a standard.

It is still another object of this invention to provide an improved system for synchronizing the angular positions of drive shafts of, or rotatable elements driven by engines whereby a servomechanism having a plurality of inner feedback loops may be utilized.

It is another object of this invention to provide an improved system for synchronizing, with respect to angular position, the drive shafts of, or rotatable elements driven by, the engines of an aircraft, the system including a closed servo loop comprising an element approximately simulating the dynamic characteristics of an inaccessible servomechanism output element.

It is a further object of this invention to provide an improved servomechanism employing analogues to replace inaccessible elements in the system, thereby providing improved stability in overall operation.

It is still another object of this invention to provide an improved system for positional synchronization of a plurality of aircraft rotatable elements which is completely compatible with existing speed synchronizing systems.

Further and additional objects of this invention will become manifest from a consideration of this specification, the accompanying drawings and the appended claim.

In a typical speed synchronizing installation for aircraft engine control, the basic system includes variable propellers controlled by pitch control motors energized from an intermittent relay. The intermittent relay is actuated through a modulator by a hysteresis motor which rotates in a direction and at a speed representative of the direction and magnitude of any difference between the speeds of a standard motor and a three-phase alternator driven from the aircraft engine. Such a system is responsive only to speed and will not provide phase or position synchronization, as is provided by the closed loop system of this invention.

In accordance with this invention a first electrical signal is provided which represents the instantaneous angular position of an element such as the rotor of a motor rotating at a standard speed and a second signal is generated which represents the instantaneous angular position of a rotatable element such as the drive shaft or propeller of an aircraft engine to be controlled. The phasic relationship between these two signals is determined and the above described intermittent relay is energized in accordance with this relationship. Inasmuch as the aforedescribed system involves a relatively long series of interconnected driving and control elements whereby phase shifts, time lags, and energy storages, it may have poor stability or may actually be unstable. Therefore, one important aspect of this invention is the introduction of a plurality of inner, or auxiliary, servomechanism loops including predetermined components analogous to the output element of the system, thereby providing greatly enhanced overall stability. In addition to improved stability the inner loops provide more rapid error correction, reduced time constants, and reduced phase shift throughout the system.

One important servo inner loop effectively interconnects the output of the propeller pitch control motor and the input to the servomechanism. Because the pitch control motor is inaccessibly disposed forwardly of the engine and propeller in the propeller hub, an important addition to the system has been provided. A pitch control motor analogue, or simulator, which substantially duplicates the important physical features of the pitch control motor is inserted in the inner feedback loop between the input to the pitch control motor and the input to the servocontrol. Thereby any phase shifs or time constants inherent in the pitch control motor are compensated for without necessitating access to the pitch control motor output. A further improvement in overall response is provided by including in the feedback loop a network which effectively synthesizes the aircraft engine characteristics whereby the feedback signal is modified further to represent the time delays attributable to the inertia, friction, etc., of the engine.

While the pitch control motor analogue might be the precise duplicate of the pitch control motor, it is generally found that a simple network capable of reproducing only the important transient characteristics of the motor will suffice. For the purposes of this invention a simple resistance-capacitance integrating network with accompanying controls has been found sufficient.

For a more complete understanding of this invention reference will now be made to the accompanying drawings wherein.

Figure 1:
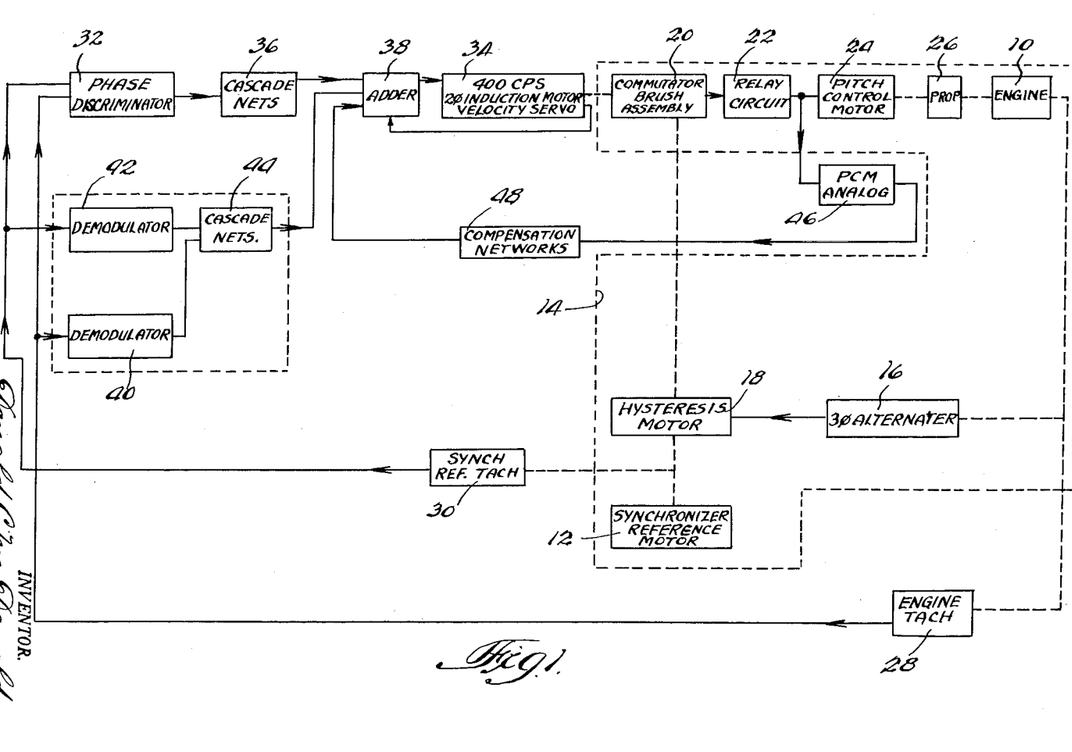
Figure 1 is a block diagram of the components and connections provided in one embodiment of the improved positional synchronizing system.

Referring now to the drawings and more particularly to Fig. 1, the system for synchronization is illustrated as applied to a single aircraft engine 10. The speed and angular orientation of a rotatable element of, or driven by, engine 10 are compared with similar quantities attributable to reference motor 12 and controlled both in velocity and position in accordance therewith. The portions of the diagram illustrated in Fig. 1 which are enclosed in the dotted line box 14 are generally a part of the conventional speed control system for multi-engine aircraft. In such a system the engine 10 is mechanically connected to a three-phase alternator 16 which applies a three-phase voltage output to the rotor windings of a hysteresis motor 18. The synchronizer reference motor 12 drives the rotor windings of the hysteresis motor 18 at a speed depending upon the desired speed of the engines.

Figure 2:
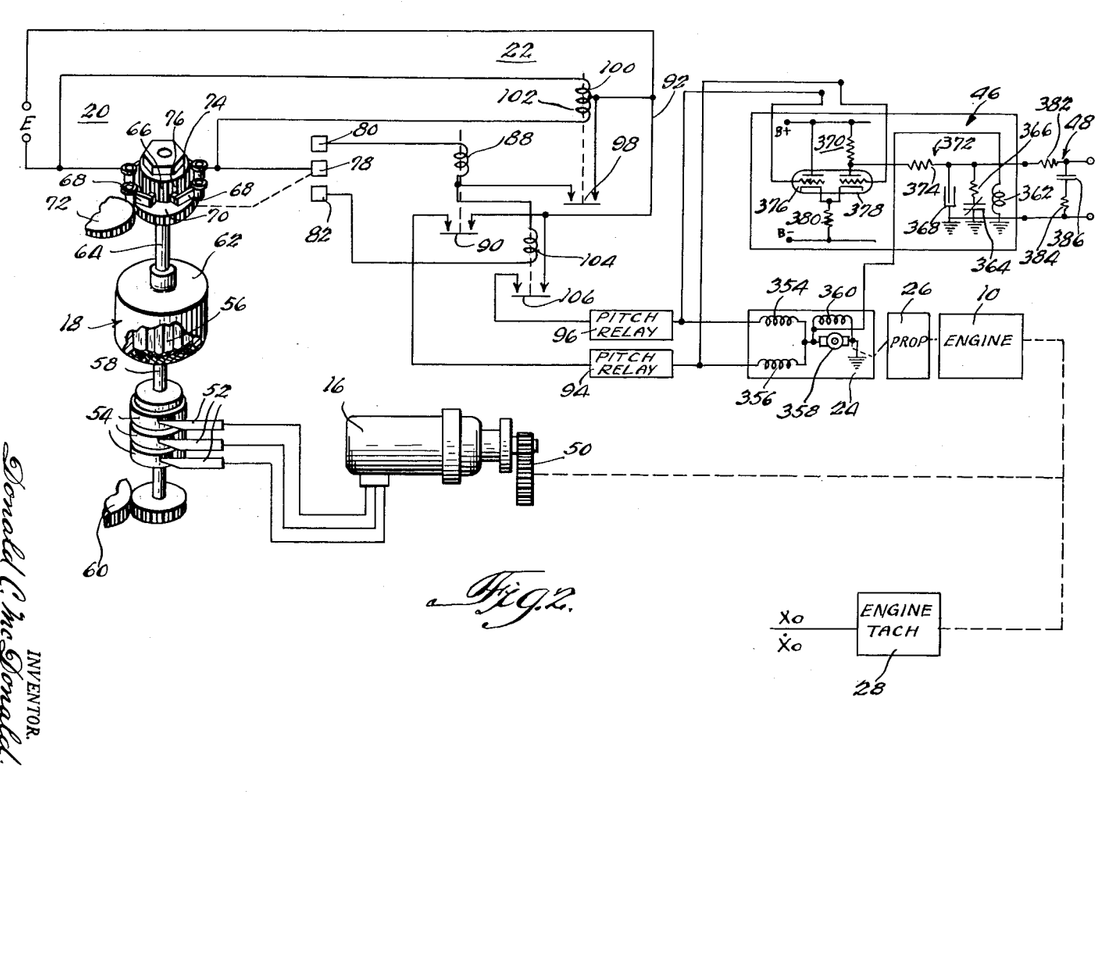
Fig. 2 is a schematic diagram of the velocity responsive portion of the embodiment of Fig. 1.

As will be clear from a consideration of Fig. 2 the hysteresis motor stator or shell 62 will remain quiescent if the speed of the reference motor 12 corresponds to the speed of rotation of the three-phase field generated by alternator 16. However, if these two outputs differ, the hysteresis motor stator 62 will experience a rotating field and produce a mechanical displacement which will shift the commutator and commutator brush assembly 20, thereby energizing the relay circuit 22. Energizing relay circuit 22 will, in turn, energize pitch control motor 24 varying the pitch of propellers 26. Variations in the pitch of the propellers will, as is well understood, produce varying torque in the engine 10, and thus vary the engine speed. If the engine is running at a higher speed than the reference motor 12, the system will automatically increase the pitch of propellers 26 increasing the load on the engine 10 and thus producing lower engine speeds. While it would be possible in view of the invention disclosed herein to eliminate this control of engine speed, it is maintained herein as an important feature of the overall system, thus producing increased stability in the system and improved speed of response.

Referring again to Fig. 1, the position controlling system comprises generally a tachometer 28, which, for example, may be coupled mechanically to and driven by engine 10, a reference tachometer 30 driven by motor 12, a phase discriminator 32 energized by the tachometers 28 and 30, and a velocity servomechanism 34. The engine tachometer and reference tachometer may be any conventional tachometer or other device which will generate an A.C. electrical signal of varying frequency and amplitude corresponding to the magnitude of an input quantity. The tachometer outputs are compared in the phase discriminator to produce a D.C. voltage corresponding to the phasic relationship of the tachometer voltages. This D.C. signal is applied to a cascade network 36 and is then combined with other signals, to be described hereinafter, in the adder circuit 38 for controlling the velocity servomechanism 34. The output of the velocity servomechanism 34 controls the angular position of the commutator brush assembly 20. Thus, if the phase discriminator 32 detects a difference between the respective angular positions of the driving shafts of the reference motor and aircraft engine, as represented by the A.C. output signals from tachometers 28 and 30, the commutator brush assembly 20 will actuate the pitch control motor 24, thus changing the load on the propeller a sufficient amount to eliminate the difference.

Further controls are provided for additional stability, the most important of which is the use of a velocity signal developed in the modulators 40 and 42 in combination with the difference, or error, signal generated in the phase discriminator 32. Hence, outputs of the tachometers 28 and 30 are applied respectively to demodulators 40 and 42 and a signal proportional to the difference in magnitude of the two tachometer outputs is applied to the adder circuit 38 through a cascade network 44.

An inner loop is provided between the output of the relay circuit 22 and the input to the adder circuit 38. Included in this loop are a pitch control motor analogue 46 and the necessary compensation networks 48. As already described above, it is highly desirable to provide an inner loop interconnecting the output of the pitch control motor 24 and the input to the velocity servomechanism 34. Inasmuch as this would be impossible, the control motor analogue circuit 46 is provided. Thus, it is possible to completely compensate for the dynamic characteristics of the pitch control motor.

For a more complete understanding of the various components described above, reference will now be made to the remaining figures.

Fig. 2 illustrates the components which form a part of an engine velocity control system. The aircraft engine 10 mechanically drives the three-phase alternator 16 through spur gears 50. The output of three-phase alternator 16 is applied through brushes 52 and slip rings 54 to the three-phase rotor winding 56 of the hysteresis motor 18. The winding 56 is mounted on shaft 58 and rotated therewith through spur gears 60 which are driven by the reference motor 12 (not shown in Fig. 2). A shell 62 of hysteresis material encloses the windings 56 in a conventional manner whereby rotation of the field generated in windings 56 will produce rotational force on the shell 62. Thus, if the alternator were generating a three-phase signal in the windings 56 and the reference motor were quiescent, a rotational force would be exerted on the shell 62 tending to cause the shell 62 to rotate at approximately the speed of rotation of the electrical field. However, if the reference motor is driving the windings 56 in a given direction and the three-phase signal is rotating at the same speed in the opposite direction, it is believed clear that the effective field motion will be zero, thus producing no rotational force on the shell 62. The shell 62 is connected through shaft 64 to a commutator 66. Brushes 68 are mounted on a spur gear 70 which is rotatable about its axis and also rotatable relative to commutator 66. The spur gear 70 is appropriately driven through gear 72 which, in turn, may be driven by the output servo motor (not shown) of the velocity servomechanism 34 (Fig. 1).

The commutator 66 comprises a plurality of spaced conductors 74 and interposed spaced insulators 76. Diametrically opposed conductors are electrically interconnected whereby a circuit is completed between the brushes 68 when the commutator 66 is in predetermined spaced positions, while the circuit between the brushes 68 is open when the commutator is shifted to alternate spaced positions. A movable contact 78 is mechanically connected to the brush-carrying gear 70 whereby the dragging of brushes 68 resulting from the relative motion of commutator 66 and brushes 68 will cause movable contact 78 to engage either contact 80 corresponding to decreasing engine speed or contact 82 corresponding to increasing engine speed.

The relay circuit 22 which is energized from the brush and commutator assembly 20 will now be explained. It is the purpose of the relay circuit 22 to energize the pitch motor 24 for a short period of time whenever the commutator 66 or the brush assembly shifts through the small angle required to complete a circuit between the brushes 68. Electrical power is provided for the relay circuit at terminals E whereby interrupter relay winding 100 is normally energized to close contacts 98. Assuming clockwise motion of the commutator 66 whereby the circuit is completed between the brushes 68 and the movable contact 78 engages contact 80, a relay coil 88 will be energized through brushes 68, contact 78, contact 80, coil 88, contacts 98, thereby, closing switch 90. Switch 90 completes a circuit through conductor 92 and contacts 90 to pitch control relay 94. The relay 94 will rotate the pitch motor 24 in a direction to increase the propeller pitch and thus decrease engine speed. The pitch control analogue 46 is also energized thereby. A similar pitch control relay 96 is provided to operate the motor 24 in the opposite direction to decrease the propeller pitch and consequently increase engine speed. The relays 94 and 96 normally will be located within the engine nacelle and are not shown in any detail herein. When the commutator 66 shifts to complete the circuit between the brushes 68, coil portion 102 is also energized, and this portion, which is oppositely wound with respect to coil portion 100, cancels the flux generated thereby, causing contacts 98 to open. Thus, the circuit of relay coil 88 will be opened following the shifting of commutator 66 or brushes 68. The relay coils 100 and 102 have conventional time delay means, such as shorted turns, whereby the opening of contacts 98 is delayed a predetermined time. Similarly, the coil 88 also includes shorted turns whereby a time delay is introduced thereby. Thus, the coil 88 is energized when the shell of the hysteresis motor rotates and remains energized for a fraction of a second thereafter, the time being determined by the release characteristics of relay coils 100 and 102, and 88. This time interval is sufficient to permit a slight rotation of the pitch motor 24 producing a slight change in propeller pitch and a correspondingly slight correction in engine speed. To increase engine speed an identical sequence is followed. The movable contact 78, actuated by spur tooth gear 70, engages contact 82 completing a circuit through brushes 68, contact 78, contact 82, coil 104 and contacts 98. Thereby contacts 106 are closed, energizing the pitch relay 96 and decreasing the pitch through pitch motor 24. Following the predetermined time delay, contacts 98 open, de-energizing coil 104. Following a second time delay inherent in coil 104, the contacts 106, open, stopping the pitch motor.

The corrections in propeller pitch will generally be very slight and gradual. However, in the event that large corrections are required the hysteresis motor shell 62 will continue to rotate, causing intermittent opening and closing of the brush circuit which will intermittently reenergize the coil 102 at a rate greater than the rate determined by the time delay inherent in the relay system, whereby the pitch motor 24 will be continuously energized. When the system described is compensating for incorrect angular positions of the various rotating elements the normal cycle will generally first increase the pitch, in compensating for a leading propeller phase angle, for example, to slow the engine and bring it into substantial positional agreement with the reference, after which the system will, in the ideal situation, decrease the pitch slightly to re-establish velocity agreement between the elements while maintaining positional agreement. In practice, because of motor torque, there will be some overshooting and hunting in the system. The engine tachometer 28 which has already been described above is driven from the engine 10.

Figure 3:
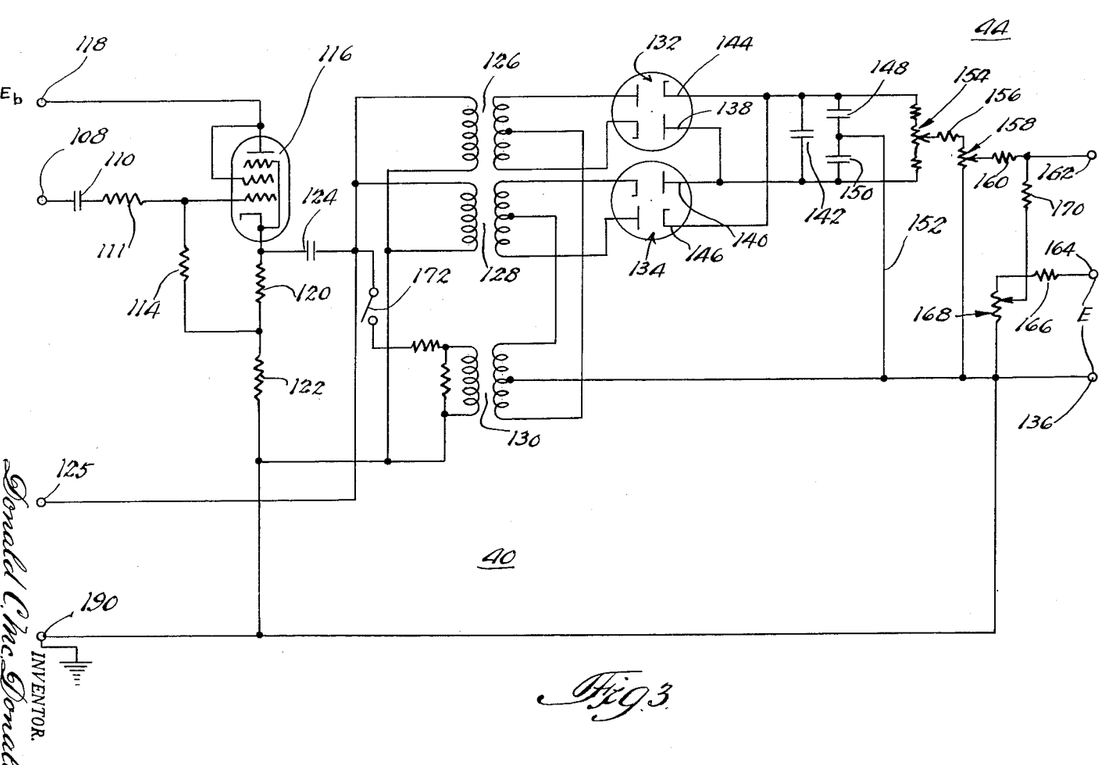
Fig. 3 is a schematic diagram of the electric circuit of the demodulator portion of the embodiment of Fig. 1.

Referring now to Fig. 3, the details of the demodulator circuits 40 and 42 and cascade network 44 will be explained. While the embodiment discussed with respect to Fig. 1 provides for separate demodulation of two signals representative, respectively, of the angular position of a propeller and a rotatable standard element such as the shaft of the reference motor 12, a showing of two demodulators has been omitted in the circuit diagram of Fig. 3. In this figure a single demodulator 40 is shown having a source E of constant D.C. potential applied between terminal 136 and 164 to represent the continuous D.C. output of the synchronizer demodulator 42 (Fig. 1). The output of engine tachometer 28 is applied at terminal 108 to the demodulator 40. The signal is passed through a blocking condenser 110 and a resistor network including series resistor 111 and grid resistor 114 to the control grid of a pentode 116. The pentode 116 is connected in a conventional cathode follower circuit wherein the plate is connected to a source of positive voltage 118 and the cathode is connected to a pair of series cathode resistors 120 and 122. The output of the cathode follower circuit is applied through by-pass condenser 124 to the primary windings of three center tapped transformers 126, 128 and 130. The cathode follower output is also made available at terminal 125, the signal being applied therefrom to the phase discriminator to be described. The secondaries of transformers 126 and 128 are connected to respective double diodes 132 and 134 in a full wave balanced circuit with the center taps of said secondaries being connected to the end terminals of the secondary of the third transformer 130. The center tap of the secondary of the transformer 130 provides one output terminal 136 of the demodulator. The transformer 130 provides a datum voltage with respect to which the output of the demodulator circuit may vary. The plates of diode sections 138 and 140 are connected to one terminal of a storage condenser 142, while the cathodes of the remaining diode sections 144 and 146 are connected to the remaining terminal of storage condenser 142, whereby the condenser maintains a charge which is directly related to the magnitude of the incoming signal. Connected in parallel with storage condenser 142 are a pair of serially connected voltage dividing condensers 148 and 150, the common terminal of said condensers being connected through conductor 152 to output terminal 136.

A potentiometer 154 is also connected in parallel with storage condenser 142, the wiper of which is connected through resistor 156 to a second potentiometer 158 having one terminal connected to terminal 136. The wiper of potentiometer 158 is connected through resistor 160 to the second output terminal 162 of the demodulator, the voltage existing between terminals 136 and 162 representing the magnitude of the difference in velocity between the reference motor 12 and the aircraft engine 10. As the A.C. output of reference tachometer 30, driven by reference motor 12 is with a voltage of substantially constant amplitude, the output of demodulator 42 will be a D.C. potential of substantially constant magnitude. In the instant embodiment, this D.C. potential is represented as a manually variable D.C. voltage established between the ground source of constant potential on terminal 136 and the output voltage of demodulator 42. This voltage is developed across a voltage divider including resistor 166 and potentiometer 168. The wiper of potentiometer 168 is connected to the output terminal 162 through a resistor 170. As a result, a fixed D.C. voltage representing the velocity of reference motor 12 is subtracted from the D.C. potential representing the engine shaft velocity. The datum voltage applied to transformer 130 may be omitted from the demodulator by opening switch 172 as may be required during initial adjustment of the apparatus.

Figure 4:
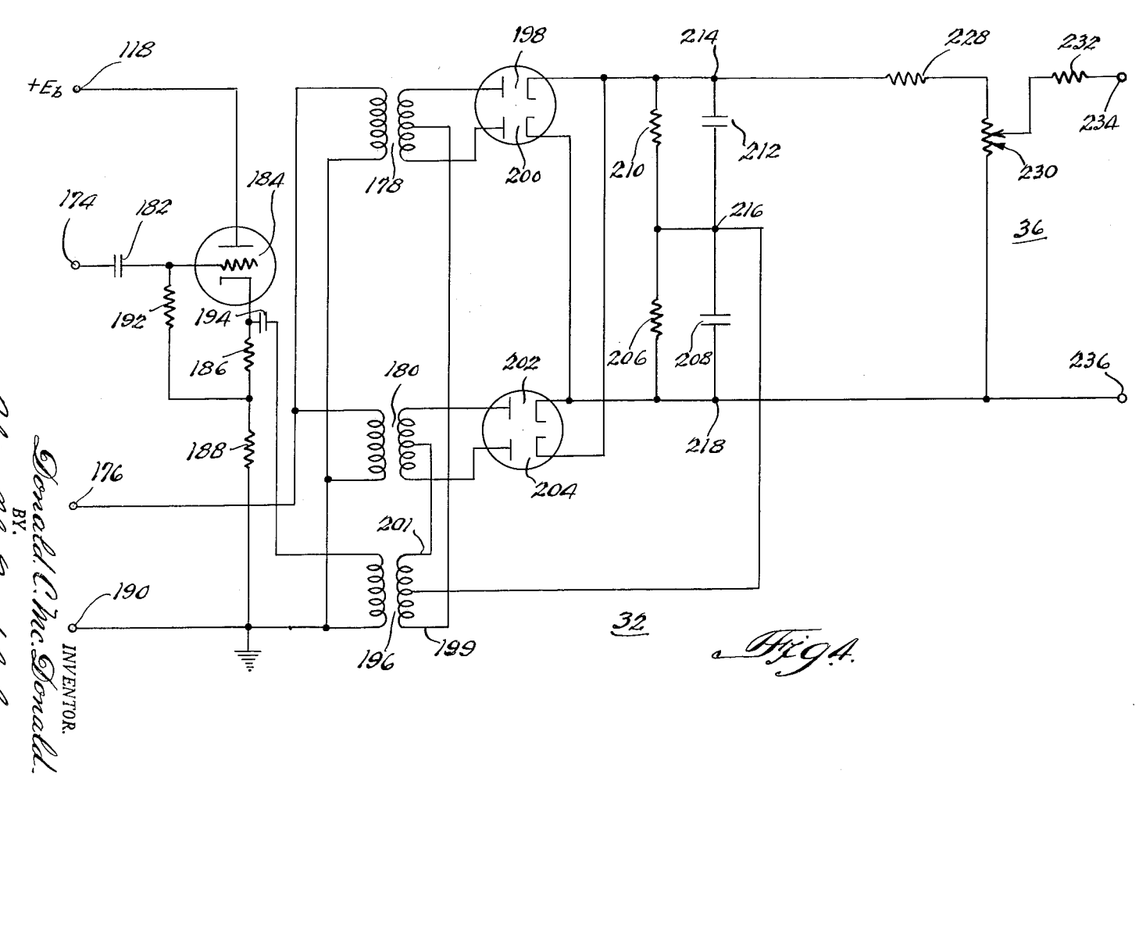
Fig. 4 is a schematic electrical diagram of the phase demodulator forming a part of the embodiment of Fig. 1.

The phase discriminator 32 illustrated in block form in Fig. 1 is disclosed in detail in Fig. 4. Two inputs are provided for the phase discriminator, one being an A.C. voltage generated by the reference tachometer 30 having a phase representing the instantaneous angular position of the shaft of the reference motor 12, this signal being applied to terminal 174; and the second being an A.C. voltage generated by engine tachometer 28 representing the instantaneous angular position of the propeller which is applied to terminal 176 from tachometer 28 through terminal 125 of the demodulator 40. In phase discriminator 32 a signal representing the angular position of the propeller is applied to terminal 176 to energize the primary windings of transformers 178 and 180. The reference signal from reference tachometer 30 is applied to terminal 174 from whence it passes through coupling condenser 182 to energize the control grid of triode 184 which is connected in a cathode follower circuit. The plate of triode 184 is directly connected to positive voltage source 118 and the cathode thereof is connected through series cathode resistors 186 and 188 to ground terminal 190. The grid resistor 192 is connected to the common terminals of cathode resistors 186 and 188 and the control grid of triode 184. The output of the cathode follower circuit is applied through condenser 194 to the primary of the reference signal transformer 196. The servo-mechanism system will function in such a manner that the voltage vector of the reference transformer 196 will be in quadrature with the voltage vectors of transformers 178 and 180. Whenever this phase relationship is altered as a result of a shift in the angular position of the engine shaft relative to that of the reference motor, the signal applied to terminal 176 will shift correspondingly, causing an unbalance and, consequently, a D.C. output on terminals 234 and 236 in a conventional manner.

The outer terminals of the secondary winding of transformer 178 are connected to the plate electrodes of a pair of diodes 198 and 200. The center tap of the secondary of transformer 178 is connected to one terminal 199 of a secondary of the transformer 196. Similarly, the terminals of the secondary winding of transformer 180 are connected to the plates of diodes 202 and 204, and the center tap thereof is connected to the other terminal 201 of the secondary of transformer 196. The center tap of the secondary of transformer 196 is connected to an intermediate point between a network comprising resistor 206, and condenser 208, and a network comprising resistor 210 and condenser 212. The cathodes of diodes 198 and 204 are connected to the upper terminal 214 of resistor 210 and condenser 212, while the cathodes of diodes 200 and 202 are connected to the lower terminal 218 of resistor 206 and condenser 208. Thus a circuit is provided to charge the condenser 212 to a positive voltage determined by the magnitude of the voltage applied to transformers 178 and 180 combined in quadrature with a voltage determined by the one half of the secondary of transformer 196. Similarly, a positive charge is developed across condenser 208, the magnitude of which is determined by a voltage of opposite polarity from that described above from transformers 178 and 180 and the quadrature voltage of one half of the secondary winding of transformer 196. Therefore, when the quadrature relationship between the reference signal and engine signal are established, the positive potential of point 214 relative to the voltage of center terminal 216 will be the same as the positive potential of point 218, producing a net voltage between the points 214 and 218 of zero. If the quadrature relationship of the voltages in the transformers 178 and 180, and the voltage in transformer 196 is shifted because of a change of relative engine position, the positive potential of either point 214 or 218 will rise, while the voltage of the remaining point will be reduced, producing a net positive or negative voltage at the output of the phase discriminator. A resistance network 36 including resistor 228, potentiometer 230, and resistor 232 are connected between terminal point 214 and network terminal 234. This resistance network 36 provides a gain control for the discriminator. Thus, a D.C. variable voltage is provided between the terminals 234 and 236 which is related to the instantaneous relative shaft positions of the reference motor 12 and the engine 10. This signal is combined with the output signal of the demodulator 40 described with respect to Fig. 3 to produce a control signal in the adder circuit 38 to energize the velocity servomechanism 34.

Figure 5:
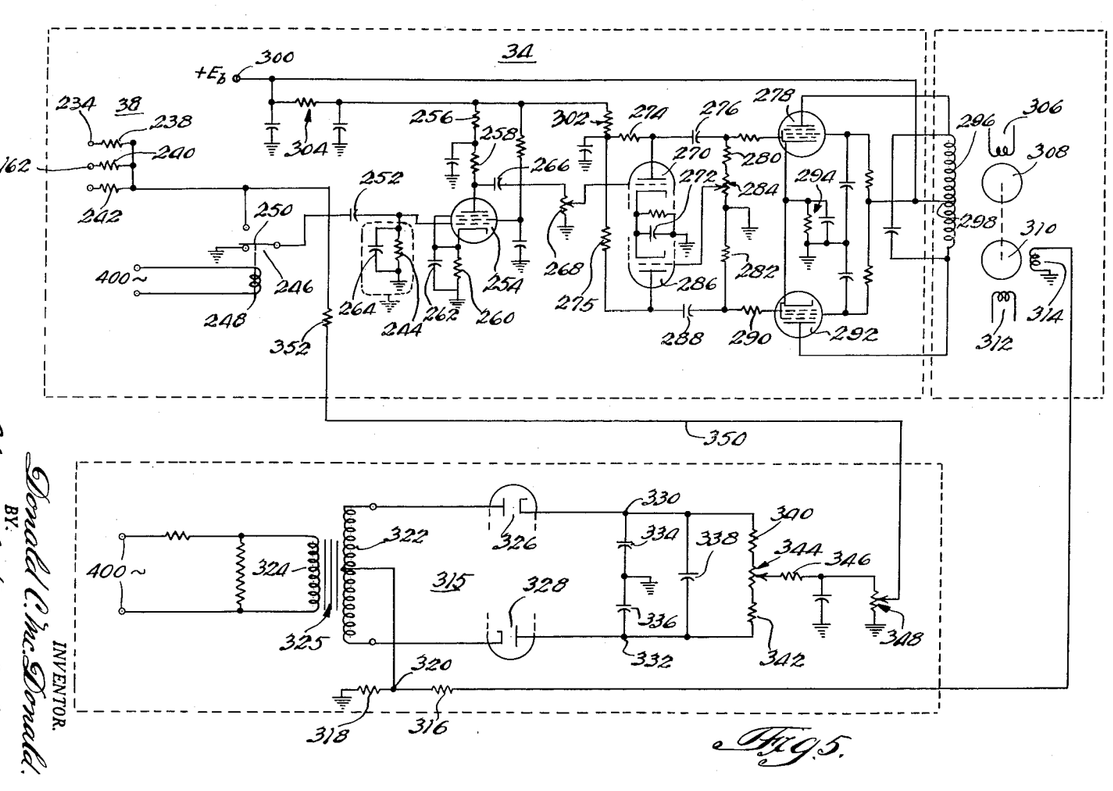
Fig. 5 is a schematic electrical diagram illustrating the circuit and components of the velocity servomechanism forming a part of the embodiment of Fig. 1.

The velocity servomechanism is illustrated in detail in Fig. 5. Therein it can be seen that the adder circuit 38 comprises three resistors 238, 240 and 242 connected respectively to the output terminal 234 of the phase discriminator, the output terminal 162 of the demodulator 40 and the feedback network 48 from the pitch control motor. The three resistors have a common connection, and this combination is periodically connected in series with a coupling condenser 252 and a grid network including condenser 264 and resistor 244 across which a voltage is developed representing the sum of the various input voltages. The servomechanism 34 is an A.C. system and the various input voltages are D.C. magnitudes. Therefore, a conventional chopper 246 is provided having an actuating coil 248 and a double throw single pole switch 250. The coil 248 is energized from an A.C. source such as a conventional 400 c.p.s aircraft system. Thus, the switch arm 250 oscillates producing a four hundred cycle voltage across the resistor 244. This 400 c.p.s. signal is applied to the control grid of pentode 254 which is connected in a conventional amplifier circuit including plate resistors 256 and 258, cathode resistor 260, and by-pass condenser 262. The output of pentode 254 is applied through condenser 266 to a potentiometer 268 providing gain control. The wiper of potentiometer 268 is connected to the control grid of the triode 270 forming one-half of a phase inversion circuit. The triode 270 and a similar triode 286 have a conventional cathode network 272, triode 270 having a plate resistor 274 and triode 286 having plate resistor 275. The output of triode 270 is applied through condenser 276 to a pentode 278 forming one-half of a push-pull circuit. This signal is also applied to a resistance network including resistor 280 and potentiometer 284, the wiper of said potentiometer being connected to the control grid of triode 286. As is well known in this art this circuitry will produce a 180° phase inversion at the output of triode 286 and this inverted signal is applied through coupling condenser 288 and a grid network including resistor 282 and resistor 290 to a pentode 292 forming the other half of the push-pull circuit already mentioned.

The pentodes 278 and 292 have their respective plates connected to the terminals of a two-phase induction motor winding 296. A center tap 298 of the motor winding is connected directly to a source of positive voltage 300. Similarly, all of the plate circuits described above are connected to the terminal 300 through various intermediate filter networks 302 and 304. The winding 296 and a second winding 306 energize a rotating motor armature 308 in a conventional manner. Connected on a common shaft with armature 308 is a generator armature 310 having associated therewith two windings 312 and 314. The windings 306 and 312 will normally be energized with a fixed 400 c.p.s. voltage and the winding 314 will develop a 400 c.p.s. signal, the magnitude of which depends upon the speed of rotation of the armatures 308 and 310. The 400 c.p.s. output of winding 314 is applied through resistors 316 and 318 to ground. A balanced demodulator 315 is energized from terminal 320 of resistors 316 and 318 and from the center-tapped secondary 322 of an input transformer 325. The primary 324 of transformer 325 is energized with a constant 400 c.p.s. voltage, whereby the diodes 326 and 328 function as a balanced demodulator producing an output between points 330 and 332 which is a D.C. voltage directly related to the magnitude of the A.C. voltage generated in winding 314 and having a polarity directly related to the phase of the A.C. signal and thus the D.C. voltage is directly related to the speed of the servomotor. This D.C. voltage is developed of across a pair of condensers 334 and 336, the common connection of which is grounded. Connected in parallel with the series network of condensers 334 and 336 is a condenser 338 and a resistance network including resistors 340 and 342 and potentiometer 344. This resistance network provides means for balancing the servosystem to a desired quiescent velocity level, usually zero. Thus, the voltage output of the demodulator will appear between ground and the wiper of potentiometer 344. This signal is applied through resistor 346 and potentiometer 348, conductor 350 and resistor 352 to the common input terminal of the resistors 238, 240 and 242, and thus provides a stabilizing velocity feedback signal for controlling the servosystem.

The remaining inner servoloop to be described is the loop including pitch control motor analogue 46 and compensation networks 48. Such a loop will depend for its specific character upon the installation. In one typical embodiment it has been found that the pitch control motor analogue 46 may be a simple R.C. network with the necessary controls whereby only a transient characteristic of the motor is duplicated. The output of this feedback loop, as already described, is applied directly to the input resistor 242 forming a part of the adder 38 and illustrated in Fig. 5.

One particularly effective pitch control motor and pitch control motor analogue are shown in Fig. 2. Therein it can be seen that the pitch control motor 24, which is controlled by control relays 94 and 96, includes split field windings 354 and 356, armature 358, and a normally actuated electromagnetic brake having deactuating solenoid 360. The solenoid 360 is deactuated, and consequently the brake is actuated upon de-energization of motor 24. The brake solenoid is in parallel with coil 362 which controls normally closed contacts 364 whereby resistance 366 is placed in parallel with condenser 368 for reasons which will appear from the description. The complete pitch change motor analogue 46 includes a conventional differential amplifier 370 which is energized directly from the relay circuits 94 and 96 and has an output applied to network 372 which includes condenser 368 and resistor 374. Differential amplifier 370 includes triodes 376 and 378 having a common cathode resistor 380. Thus when a negative voltage is applied to the grid of triode 376 from pitch relay 96, a negative output voltage is produced, while a negative signal on the grid of triode 378 produces a positive output signal. This is a direct analogue of the field windings 354 and 356 which have a duel input with a single bi-polar output. The time constant of this integrating network including resistor 374 and condenser 368 closely approximates the speed-change characteristics of the motor 24. The motor is rapidly decelerated by the brake, and thus the time constant for discharging condenser 368 must also be short. The time constant for discharge of condenser 368 is provided by inserting resistor 366 in parallel with condenser 368 through contacts 364 whenever brake solenoid 360 is de-energized.

The output of analogue 46 is applied to compensating network 48. Network 48 comprises series resistor 382 and a shunt network including resistor 384 and condenser 386. It can be shown that the output of pitch change motor 24 and consequently also the output of analogue 46 when passed through a network providing a single constant approximates engine speed changes in response to pitch changes. Hence the combination of resistor 382 and condenser 386 produces such an engine speed change signal. The single resistance-capacitance network is selected to simulate the engine time constant, although it is recognized that the engine characteristic is a more complex function. The network should also have a high motor analogue impedance relative to the preceding pitch change. The use of the engine speed-change signal in the input of the servomechanism amplifier 34 substantially enhances over-all performance and stability. In fact, such a synthetic signal is superior to one actually derived from the engine 10, in that it is substantially free of spurious noise, which would be present in a signal from the engine.

The particular system herein described has been installed on various aircraft engines in association with existing speed synchronizing pitch control mechanisms. It has been found to function satisfactorily and to give optimum positional control of the various engines with maximum speed of response and stability. It is manifest that each aircraft and engine system may require a particular set of networks and feedback loops and it is herein intended merely to illustrate in detail one operative embodiment for a particular installation. However, the concepts of utilizing both speed sensing and continuous positional control, analogue networks for inaccessible components of the system, and a plurality of inner closed loops for greater stability and reduced time lag and energy storage are clearly applicable, with modifications, within the scope of men skilled in this art, to many uses.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claim.

I claim:

A follow-up servo system for controlling the instantaneous angular position of a rotatable element of an aircraft engine, the said system comprising: an engine; a propeller coupled to the said engine; first means coupled to the said engine for generating an electrical signal representing the instantaneous angular position of the said propeller; second means for generating a standard electrical signal representing a predetermined engine speed and instantaneous angular position for a rotatable element of the said engine; third means coupled to the said first and second means for developing a difference signal representing the speed difference between the said propeller and the said predetermined speed; fourth means coupled to the said first and second means and responsive to said electrical and said standard electrical signals for developing an electrical signal representing any instantaneous discrepancy between the angular position of the said propeller and the angular position represented by the said standard signal; fifth means coupled to said third and fourth means for controlling the pitch of the said propeller in response to the said speed difference and angular error signals, the said fifth means including a servomechanism having input terminals coupled to the said third and fourth means, a switch mechanism having output terminals coupled mechanically to the said servomechanism, a pitch control motor coupled to the said output terminals and to the said propeller, and a feedback channel coupled between the said output and input terminals for developing an electrical quantity analogous at least to some of the operating characteristics of the said pitch control motor.

References Cited in the file of this patent

UNITED STATES PATENTS

| | | |
|---|---|---|
| 2,322,114 | Clare | June 15, 1943 |
| 2,382,847 | Baumann | Aug. 14, 1945 |

(Other references on following page)

UNITED STATES PATENTS

| | | | |
|---|---|---|---|
| 2,478,279 | Kochenburger | Aug. 9, 1949 |
| 2,517,703 | Offner | Aug. 8, 1950 |
| 2,543,077 | Treseder | Feb. 27, 1951 |
| 2,551,306 | Wisman | May 1, 1951 |
| 2,669,312 | Dinsmore et al. | Feb. 16, 1954 |
| 2,708,258 | Westwood | May 10, 1955 |
| 2,747,141 | Hine | May 22, 1956 |
| 2,878,426 | Preli et al. | Mar. 17, 1959 |

UNITED STATES PATENT OFFICE
CERTIFICATE OF CORRECTION

Patent No. 2,986,223    May 30, 1961

Donald C. McDonald

It is hereby certified that error appears in the above numbered patent requiring correction and that the said Letters Patent should read as corrected below.

Column 9, line 9, strike out "of", second occurrence; line 56, for "duel" read -- dual --; column 10, line 53, after "electrical" insert -- error --.

Signed and sealed this 24th day of October 1961.

(SEAL)
Attest:

ERNEST W. SWIDER
Attesting Officer

DAVID L. LADD
Commissioner of Patents

USCOMM-DC